United States Patent
Cabrera (10) Patent No.: US 8,628,372 B2
(45) Date of Patent: Jan. 14, 2014

(54) SHAPE MEMORY ALLOY ACTUATOR ASSEMBLY

(76) Inventor: Pedro L. Cabrera, West Haven, CT (US)

( * ) Notice: Subject to any disclaimer, the term of this patent is extended or adjusted under 35 U.S.C. 154(b) by 259 days.

(21) Appl. No.: 13/097,192

(22) Filed: Apr. 29, 2011

(65) Prior Publication Data

US 2012/0276807 A1     Nov. 1, 2012

(51) Int. Cl.
  *A63H 11/00*     (2006.01)
  *F03G 7/06*     (2006.01)
  *A63H 13/00*     (2006.01)
  *A63H 33/00*     (2006.01)

(52) U.S. Cl.
  CPC ........... *A63H 13/00* (2013.01); *A63H 33/00* (2013.01); *F03G 7/065* (2013.01)
  USPC .............. 446/14; 446/352; 446/385; 60/527; 60/528

(58) Field of Classification Search
  CPC ......... A63H 13/00; A63H 33/00; F03G 7/065
  USPC .................. 446/352, 14, 385; 60/527, 528
  See application file for complete search history.

(56) References Cited

U.S. PATENT DOCUMENTS

| | | | |
|---|---|---|---|
| 3,418,748 A | 12/1968 | Margolis | |
| 4,109,851 A | 8/1978 | Goates | |
| 4,244,140 A * | 1/1981 | Kim | 446/14 |
| 4,774,780 A | 10/1988 | Crowell | |
| 5,013,276 A * | 5/1991 | Garfinkel | 446/14 |
| 5,138,779 A | 8/1992 | Earnest | |
| 5,139,454 A | 8/1992 | Earnest | |
| 5,518,433 A | 5/1996 | Sneddon | |
| 5,543,678 A | 8/1996 | Hoiberg | |
| 5,662,294 A * | 9/1997 | Maclean et al. | 244/219 |
| 5,891,577 A * | 4/1999 | Breitbach et al. | 428/411.1 |
| 5,988,684 A | 11/1999 | Blaustein et al. | |
| 6,138,604 A * | 10/2000 | Anderson et al. | 114/332 |
| 6,390,878 B1 * | 5/2002 | Zhou et al. | 446/14 |
| 6,394,872 B1 * | 5/2002 | Watanabe et al. | 446/175 |
| 6,426,826 B1 | 7/2002 | Marco | |
| 6,568,869 B1 * | 5/2003 | Murata | 403/52 |
| 6,776,683 B1 * | 8/2004 | Lin | 446/392 |

(Continued)

OTHER PUBLICATIONS

Z. Chaudhry and Craig A. Rogers, "Bending and Shape Control of Beams Using SMA Actuators", Journal of Intelligent Material Systems and Structures, vol. 2, 1991, pp. 581-602.

(Continued)

*Primary Examiner* — Gene Kim
*Assistant Examiner* — Alexander Niconovich
(74) *Attorney, Agent, or Firm* — MKG, LLC (57) ABSTRACT

An actuator assembly including a resilient substrate having one or more shape memory alloys secured to the substrate. The shape memory alloys are configured to move a portion or all of the actuator assembly between an at-rest configuration and an actuated configuration. The shape memory alloys are elastically bendable and can be contracted from an elongated length to a contracted length in response to transmission of an electrical current therethrough. The electrical current is of a magnitude sufficient to heat the shape memory alloys from a first temperature to a second temperature so that a portion of or the entire actuator assembly can move from the at-rest configuration to the actuated configuration. Termination or reduction of the electrical current allows the shape memory alloy to cool and thereby elongate from the contracted length to the elongated length.

14 Claims, 8 Drawing Sheets

(56) References Cited

U.S. PATENT DOCUMENTS

| | | | |
|---|---|---|---|
| 6,848,965 B2* | 2/2005 | Wong | 446/150 |
| 6,851,260 B2* | 2/2005 | Mernøe | 60/527 |
| 7,554,787 B2* | 6/2009 | Pelrine et al. | 361/234 |
| 7,865,268 B2* | 1/2011 | Alvarado et al. | 700/245 |
| 7,872,850 B2* | 1/2011 | Pelrine et al. | 361/234 |
| 7,943,211 B2* | 5/2011 | Chen | 428/9 |
| 8,111,500 B2* | 2/2012 | Pelrine et al. | 361/234 |
| 2002/0061695 A1* | 5/2002 | Zhou et al. | 446/14 |
| 2004/0077260 A1* | 4/2004 | Wong | 446/150 |
| 2005/0115235 A1 | 6/2005 | Mernoe | |
| 2006/0196104 A1* | 9/2006 | Lapointe | 43/42.24 |
| 2008/0027285 A1 | 1/2008 | Yasunaga | |
| 2008/0075930 A1* | 3/2008 | Kornbluh et al. | 428/189 |
| 2010/0003891 A1* | 1/2010 | Chen | 446/385 |

OTHER PUBLICATIONS

Guoping Wang and Mohsen Shahinpoor, "Design and prototyping and computer simulations of a novel large bending actuator made with a shape memory alloy contractile wire", Smart Material Structures, vol. 6, 1997, pp. 214-221.

\* cited by examiner

SHAPE MEMORY ALLOY ACTUATOR ASSEMBLY

TECHNICAL FIELD

The present disclosure relates generally to an actuator assembly and, more specifically, to an actuator assembly having a shape memory alloy (SMA) that causes movement of one or more portions of the actuator assembly between at-rest and actuated configurations, in response to changes in the temperature of the SMA caused by changes in flow of an electric current transmitted through the SMA.

BACKGROUND OF THE INVENTION

A shape memory alloy (SMA) is generally a metallic material that demonstrates shape memory effects, such as the ability to return to a previous shape or size when heated and/or cooled. For example, SMAs are typically deformed at a relatively low temperature and return to a previous shape upon heating. In addition, subsequent cooling can cause the SMAs to return to the deformed shape.

Some SMAs, such as those including nickel titanium alloys (e.g., Nitinol), have different microstructures at different temperatures. The type, size and shape of the microstructure can be changed by heating, cooling and/or the application of external forces. The changes in the type, size and shape of the SMA microstructure are in part responsible for causing the shape memory effects. In addition, alloy content can influence the response of SMAs to heating, cooling and/or application of external forces.

SMAs can be employed in many applications including aircraft, piping, robotics, medical devices, optometry and dentistry.

SUMMARY

According to aspects illustrated herein, there is provided an actuator assembly including a resilient substrate and one or more SMAs, such as SMA wires, secured to the substrate. The SMAs are configured to move a portion or all of the actuator assembly between an at-rest configuration and an actuated configuration. While in the at-rest configuration, the SMAs have an elongated length and a first temperature; and while in the actuated configuration the SMAs have a contracted length and a second temperature. The first temperature is less than the second temperature and the elongated length is greater than the contracted length. The SMAs are elastically bendable, in a temperature range encompassing the first temperature and the second temperature. In addition, the SMAs can be contracted from the elongated length to the contracted length in response to transmission of an electrical current through the SMAs. The electrical current is of a magnitude sufficient to heat the SMAs from the first temperature to the second temperature so that a portion of or the entire actuator assembly can move from the at-rest configuration to the actuated configuration, for example by bending. Termination or reduction of the electrical current allows the SMAs to cool and thereby elongate from the contracted length to the elongated length. The SMAs have a sufficient heat dissipation area to enable cooling thereof from the second temperature to the first temperature and to thereby move a portion of or the entire actuator assembly from the actuated configuration to the at-rest configuration.

The moving of the portion or the entire actuator from the actuated configuration to the at-rest configuration can be accomplished by the SMAs at a rate of greater than about 10 degrees per second, after reduction or termination of the electrical current.

Heat dissipation from the SMAs is enhanced by use of a thread stitched around each of the SMAs and through the substrate to secure the SMAs to the substrate. The thread can act as heat transfer fins to assist in the removal of heat from the SMAs. In addition, the stitching of the thread provides spaces between adjacent stitches to enhance convective heat transfer from the SMAs.

In order to improve the transmission of the electrical current to the SMAs while minimizing interference with bending of the actuator assembly, a flexible electrically conductive strip is disposed on the substrate. The electrically conductive strip is elastically bendable with the substrate and provides a vehicle for transmission of the electrical current to the SMAs.

In addition, bending of the actuator assembly is enhanced by the use one or more slots extending at least partially through the substrate. The size, orientation and positioning of the slots are selected to enhance bending of the substrate while maintaining a sufficient axial incompressibility of the substrate to withstand and react to axial forces applied thereto by the SMAs during contraction thereof.

Portions of and/or the entire actuator assembly of the present invention can move more rapidly than prior art actuators using SMA. For example, the SMAs employed in the present invention are capable of accomplishing movement of a portion of or the entire actuator assembly from the at-rest configuration to the actuated configuration in less than five seconds; moving a portion of or the entire actuator assembly from the actuated configuration to the at-rest configuration in less than about four seconds; and moving a portion of or the entire actuator assembly from the actuated configuration to the at-rest configuration at the rate of about 63 degrees per second or greater.

The present invention also includes a method for animation of images such as cartoon characters which includes providing an actuator assembly including a resilient substrate and one or more SMAs secured to the substrate. A flexible cover is secured to the substrate. One or more images are disposed on the cover and/or the substrate. The animation of the images can begin with the actuator assembly in an at-rest configuration, which in some instances can be a substantially flat configuration. In the at-rest configuration the SMAs have an elongated length. An electrical current is transmitted through the SMAs thereby heating the SMAs from a first temperature to a second temperature. Heating of the SMAs causes the SMAs to contract from the elongated length to a contracted length. Such contraction of the SMAs causes a portion of or the entire actuator assembly to move, for example, by bending, from the at-rest configuration to an actuated configuration. Termination or reduction of the electrical current allows the SMAs to cool from the second temperature to the first temperature. The cooling of the SMAs causes the SMAs to elongate to the elongated length, which in turn causes a portion of or the entire actuator assembly to move from the actuated configuration to the at-rest configuration.

The SMAs cause the portion of or the entire actuator assembly to move from the actuated configuration to the at-rest configuration at a rate of greater than about 10 degrees per second. The images are animated by moving a portion of or the entire actuator assembly from the at-rest configuration to the actuated configuration and/or moving a portion of or the entire actuator assembly from the actuated configuration to the at-rest configuration at the rate of greater than about 10 degrees per second.

BRIEF DESCRIPTION OF THE DRAWINGS

Referring now to the Figures, which are illustrative of exemplary embodiments of the present invention, and wherein the like elements are numbered alike.

DETAILED DESCRIPTION OF PREFERRED EMBODIMENTS

Figure 1:
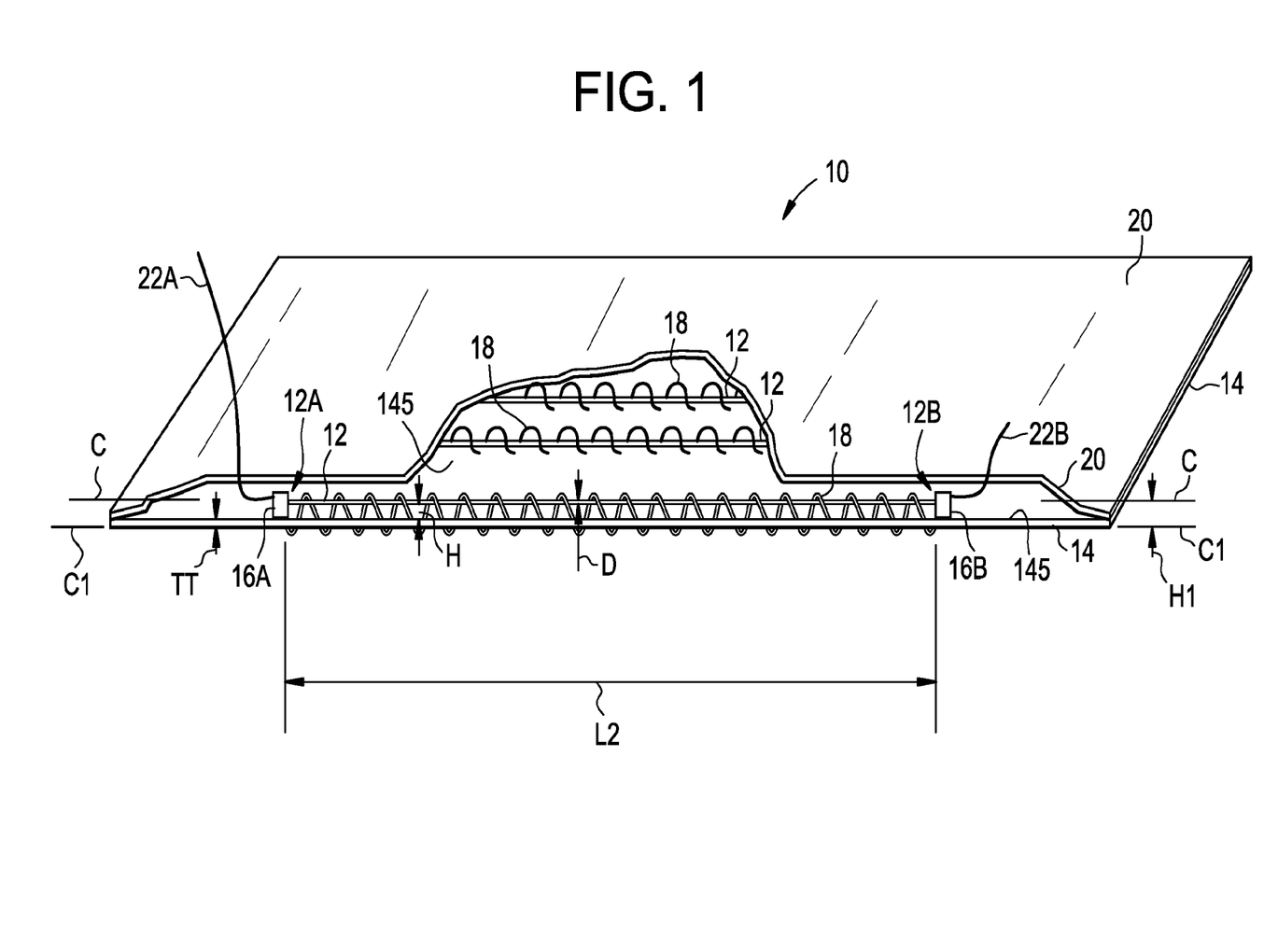
FIG. 1 is a perspective view the actuator assembly of the present invention shown in an at-rest configuration with a portion of a cover removed.

As illustrated in FIG. 1, an actuator assembly, generally designated by the numeral 10, includes shape memory alloy (SMA) wires 12 secured to a resilient substrate 14. The SMA wires 12 are configured to move a portion or all of the actuator assembly 10 between an at-rest configuration (FIG. 1) and an actuated configuration (FIG. 2), for example, by bending. The SMA wires 12 have an elongated length L2 and a first temperature while in the at-rest configuration; and have a contracted length L1 and a second temperature while in the actuated configuration. The first temperature is less than the second temperature and the elongated length L2 is greater than the contracted length L1. The SMA wires 12 are elastically bendable, in a temperature range encompassing the first temperature and the second temperature. The SMA wires 12 can be contracted from the elongated length L2 to the contracted length L1 in response to transmission of an electrical current through the SMA wires. The electrical current is of a magnitude sufficient to heat the SMA wires 12 from the first temperature to the second temperature so that a portion of or the entire actuator assembly 10 can move from the at-rest configuration to the actuated configuration. Termination or reduction of the electrical current allows the SMA wires 12 to cool and thereby cause the SMA wires to elongate from the contracted length L1 to the elongated length L2. The SMA wires 12 have a sufficient heat dissipation area to enable cooling thereof from the second temperature to the first temperature and to thereby move a portion of or the entire actuator assembly 10 from the actuated configuration to the at-rest configuration.

The SMAs are configured to move the portion of or the entire actuator assembly 10 from the actuated configuration to the at-rest configuration at an angular rate of greater than about 10 degrees per second, after reduction or termination of the current.

FIG. 1 illustrates the actuator assembly 10 as being, for example, substantially flat in the at-rest configuration. The exemplary actuator assembly 10 illustrated in FIG. 1 includes three of the SMA wires 12, each secured to the resilient substrate 14. Each of the SMA wires 12 are substantially straight and have opposing ends 12A and 12B thereof secured to the substrate 14 by suitable connectors 16A and 16B. Prior to being secured to the substrate 14, the SMA wires 12 are stretched from a contracted length L1 (see FIG. 2) along their respective longitudinal axes C to an elongated length L2 defined by an axial oriented strain of about 5 percent. The stretching is performed while the SMA wires are at or below a predetermined temperature such that each of the SMA wires 12 retain the elongated length L2 at or below the predetermined temperature. Each of the SMA wires 12 is elastically bendable when the SMA wires are at or below the predetermined temperature and higher temperatures, as described below.

Portions of each of the SMA wires 12 between the respective opposing ends 12A and 12B are restrained, by threads 18, from extending beyond a surface 14S of the substrate 14 more than a distance H. The threads 18 are stitched around each of the SMA wires 12 and through the substrate 14. A flexible cover 20 is disposed over the SMA wires 12 and the thread 18. The cover 20 is secured to the substrate 14. The cover 20 has an outwardly facing surface and shape configured for one or more uses, such as display and animation of images such as characters (e.g., cartoon characters) and/or actuation of an apparatus, as described further below.

Figure 2:
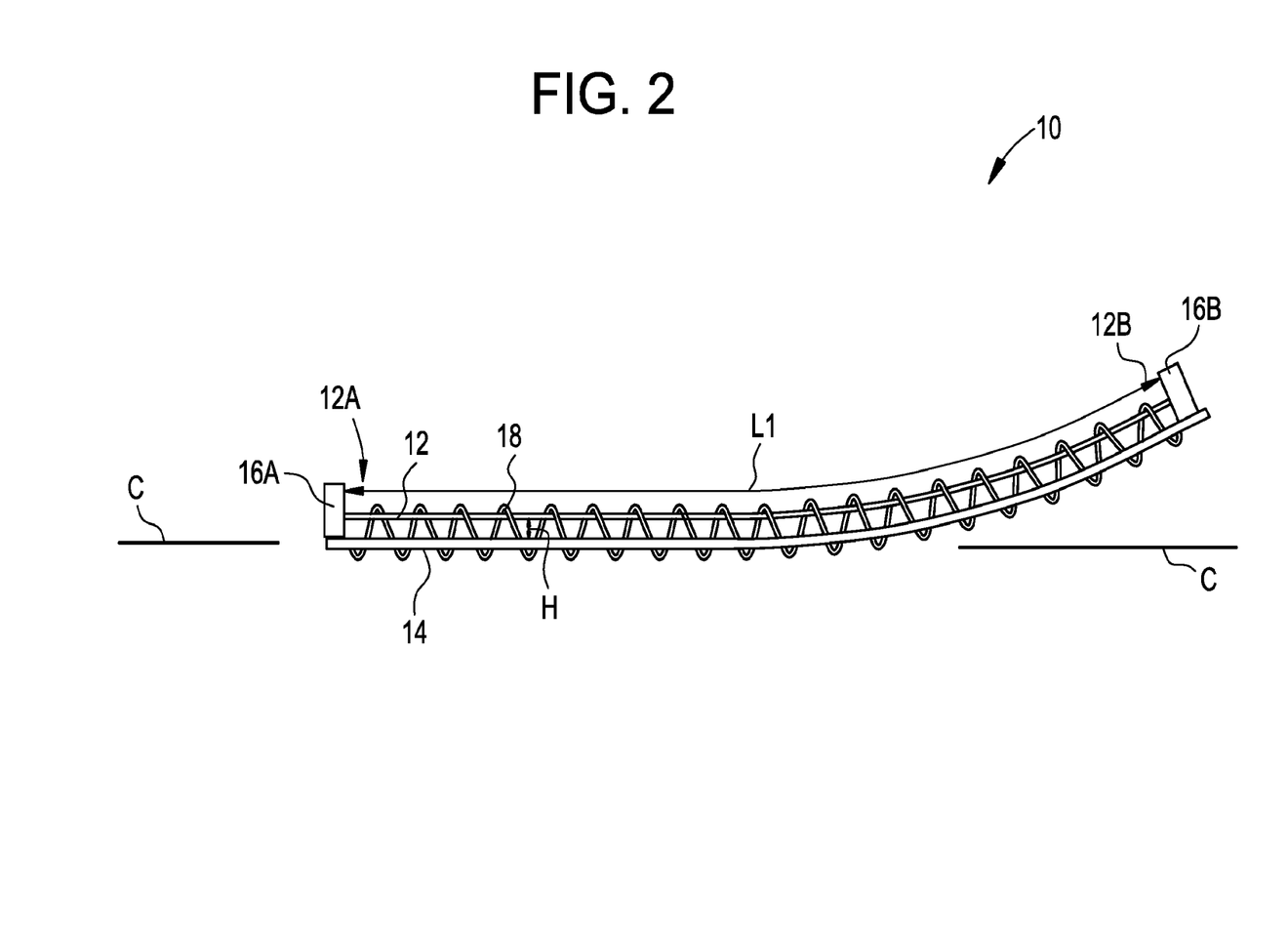
FIG. 2 is a cross sectional view of a portion of the actuator assembly of the present invention in an actuated configuration.

Each of the SMA wires 12 have electrical conductors 22A and 22B secured thereto. The electrical conductors 22A and 22B are in electrical communication with the connectors 16A and 16B, respectively, of each of the respective SMA wires 12. The connectors 16A and 16B are in electrical communication with an electrical power supply (not shown) for transmission of an electrical current through and thereby heating of the SMA wires 12. In one embodiment, the electrical current is applied in a pulsing manner to conserve energy. As described below, heating of the SMA wires 12 cause the SMA wires to contract (e.g., to the length L1) and bend to an actuated configuration, as illustrated in FIG. 2. The contraction of the SMA wires 12 also causes one or more portions of the actuator assembly 10 to move, for example, by bending, between the at-rest configuration and the actuated configuration. Reduction or termination of the transmission of the electrical current through the SMA wires 12 enables the SMA wires to cool via a sufficient heat dissipation area defined by the SMA wires. Thus the SMA wires 12 return to the elongated length L2 and the at-rest configuration illustrated in FIG. 1. The cooling and contraction of the SMA wires 12 also enables one or more portions of the actuator assembly 10 to move between the actuated configuration and the at-rest configuration, at an angular rate having a magnitude greater than about 10 degrees per second.

Although the actuator assembly 10 is shown and described as having three substantially straight SMA wires 12, the present invention is not limited in this regard as any number of SMA wires may be employed and/or other configurations and shapes of SMA may be employed including but not limited to sheets, films, bars, tubes, plates, braided wire and combinations thereof, without departing from the broader aspects disclosed herein. Although the at-rest configuration is shown and described as being substantially flat, the present invention is not limited in this regard as the at-rest configuration can be of any configuration, including but limited to curved or bent shapes. While the SMA wires 12 are shown and described as having opposing ends 12A and 12B thereof secured to the substrate 14 by suitable connectors 16A and 16B, the present invention is not limited in this regard, as each of the SMA wires can be secured to the substrate by one connector, more than two connectors, and/or any portion or portions of the SMA wires can be secured to the substrate, without departing from the broader aspects disclosed herein.

While the SMA wires 12 are described as being heated by transmitting the electrical current through the SMA wires, the present invention is not limited in this regard, as other methods of heating the SMA wires can be employed including but not limited to induction heating and immersing the SMA wires in a fluid such as a liquid or a gas and heating the fluid.

The SMA wires 12 are manufactured from metals and are electrically conductive. In one embodiment the SMA wires 12 are manufactured from a nickel titanium alloy such as Nitinol which has a martensite and/or an austenite microstructure, depending on the temperature of the SMA wires and on a load applied thereto, as described below. In one embodiment, the SMA wires 12 exhibit the microstructure transition temperature properties listed in Table 1, below.

TABLE 1

| Property Type | Description | Symbol | Temperature Range Degrees F. |
|---|---|---|---|
| Initial Austenite Transition Temperature | The temperature at which heating causes the martensite to begin to transform into austenite. | A1 | −148 to 212 |
| Initial Martensite Transformation Temperature | The temperature at which cooling causes austenite to begin to transform to martensite. | M1 | −148 to 212 |
| Final Austenite Transformation Temperature | The temperature at which continued heating above A1 causes remaining martensite to transform into austenite. | A2 | −148 to 212 |
| Final Martensite Transformation Temperature | The temperature at which continued cooling below M1 causes remaining austenite to transform into martensite. | M2 | −148 to 212 |

Based on the properties listed in Table 1, the SMA wires 12 have a microstructure of all martensite below the final martensite transition temperature M2 and a microstructure of all austenite above the final austenite transition temperature A2. The martensite microstructure is easier to deform compared to the austenite microstructure. For example, in one embodiment, each of the SMA wires 12 have a deformation stress of about 10,000 psi to about 20,000 psi for the martensite microstructure and a deformation stress of about 35,000 psi to about 100,000 psi for the austenite microstructure. While the temperature ranges for the temperatures A1, A2, M1 and M2 are all described in Table 1 as being −148 to 212 degrees Fahrenheit (F), the present invention is not limited in this regard as the other temperature ranges for the temperatures A1, A2, M1 and M2 may be employed including but not limited to ranges that do not overlap. For example, in one embodiment the initial austenite transition temperature A1 is about 154 degrees F. and the initial martensite transition temperature M1 is about 125 degrees F.

Although the SMA wires 12 are described as being manufactured from a nickel titanium alloy such as Nitinol, the present invention is not limited in this regard as other alloys can be employed, including but not limited to FLEXINOL®, manufactured by Dynalloy Inc. of Tustin, Calif., without departing from the broader aspects disclosed herein. In addition, while the SMA wires 12 are described as having initial and final transition temperatures for microstructure changes between austenite and martensite and vice versa, the present invention is not limited in this regard, as any microstructure transitions and/or other properties which support shape memory effects at various transition temperatures may also be employed without departing from the broader aspects disclosed herein.

The SMA wires 12 illustrated in FIG. 1, are elongated to the elongated length L2 from pieces of SMA wire stock (not shown). Initially, the pieces of SMA wire stock are hot formed into a substantially straight section having the contracted length L1. The SMA wire stock is formed while having the austenite microstructure at a temperature greater than the final austenite transition temperature A2. The piece of SMA wire stock is subsequently cooled to a temperature less than the final martensite transition temperature M2 to obtain the martensite microstructure. The SMA wire stock is not bent during forming. Thus the SMA wires 12 are substantially straight.

The above described forming enables the SMA wires 12 and the SMA wire stock to be elastically bendable. For example, when a suitable force is applied to the end 12A and the other end 12B is fixed, the end 12A of the SMA wires 12 will bend away from the axis C. In addition, the SMA wires 12 can be bent 360 degrees into a circular shape (see, for example, FIG. 8) wherein the opposing ends 12A and 12B engage each other, upon application of suitable forces generated by the SMA wires. Removal of the force or forces generated by the SMA wires 12 enables the SMA wires to elastically return to the at-rest configuration, coincident with the axis C, as illustrated in FIG. 1. The SMA wires 12 are capable of being repetitively and elastically cycled between the at-rest and actuated configurations, for millions of cycles without any substantial change in performance.

As pointed out above, the SMA wires 12 are shown in FIG. 1 are in the at-rest configuration, defined by an axially oriented plastic strain of about 5 percent. The 5 percent axial strain is accomplished, for example, by stretching the SMA wire stock to the elongated length L2 at a stress level which causes deformation and while the SMA wires 12 are at a temperature less than the final martensite transition temperature M2. The SMA wires 12 retain the elongated length as long as the temperature of the SMA wires are below the initial austenite transition temperature A1. During stretching, the SMA wire stock and the resulting elongated SMA wires 12 have approximately a one hundred percent martensite microstructure. In one embodiment, the axial strain is between about 4 percent and about 5 percent, which allows for repeatability of the shape memory properties, described below. While the SMA wires 12 are described as being stretched to about 4 percent to about 5 percent axial strain, the present invention is not limited in this regard, as lesser strains can also be employed and strains up to about 8 percent can also be employed, without departing from the broader aspects described herein.

The SMA wires 12 have shape memory properties, which enable the SMA wires to axially contract to a length between the contracted length L1 and the elongated length L2, by heating the SMA wires to or above the initial austenite transition temperature A1; and to contract to the contracted length L1 by heating the SMA wires to the final austenite transition temperature A2 or above. In addition, the SMA wires 12 are capable of extending to a length between the contracted length L1 and the elongated length L2 by cooling the SMA wires to a temperature between the initial martensite transition temperature M1 and the final martensite transition temperature M2, without application of external axial forces to the SMA wires. The SMA wires 12 are also capable of extending to the elongated length L2 when the SMA wires are cooled to or below the final martensite transition temperature M2. The SMA wires 12 are capable of being repetitively contracted to the contracted length L1 by heating the SMA wires and elongated to the elongated length L2 by cooling the SMA wires as described above, for millions of cycles without any substantial change in performance.

As mentioned above, the SMA wires 12 are elastically bendable and are capable of moving to the at-rest configuration illustrated in FIG. 1. In addition, the substrate 14 is manufactured from a resilient material having a stiffness such that the substrate can be cycled between the at-rest configuration and actuated configuration, without any fracturing. Thus the substrate 14 functions like a leaf spring, biased in a straight form and assists in the movement of the actuator assembly 10 between the at-rest and actuated configurations.

Figure 3:
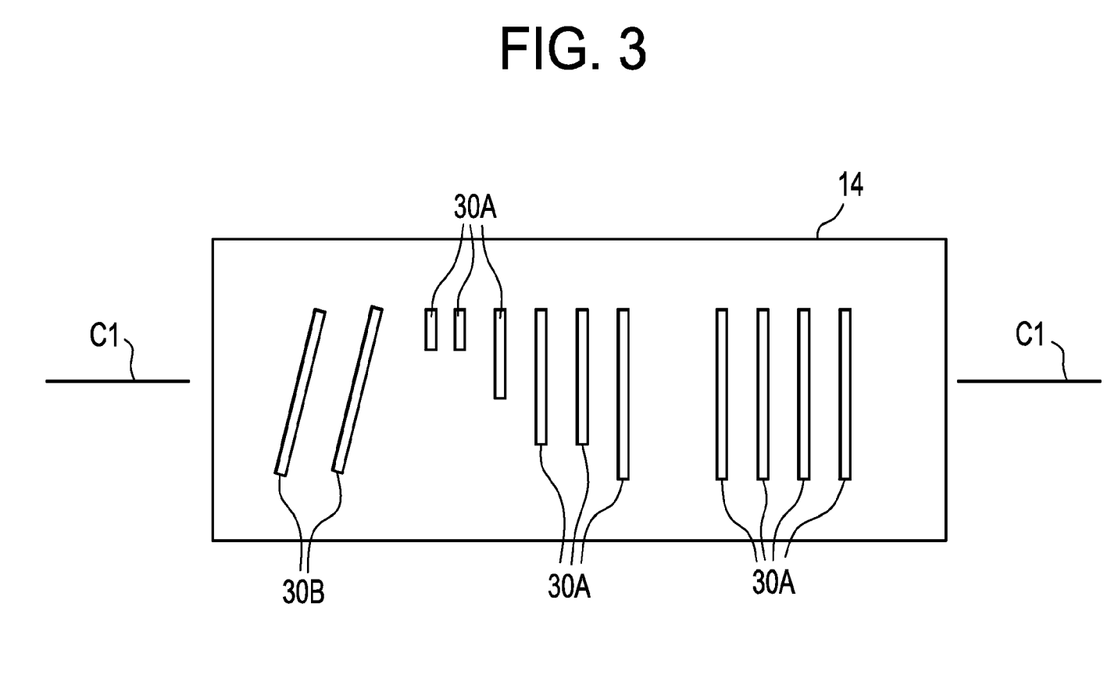
FIG. 3 is a top view of a substrate portion of the actuator assembly of FIG. 1.

In the embodiment illustrated in FIG. 3, the substrate 14 is shown having twelve slots 30A and 30B extending through the substrate. The slots 30A and 30B are sized and positioned in the substrate 14 to decrease the stiffness of the substrate, thereby enabling the substrate to bend more easily (e.g., towards the actuated configuration), more rapidly and more extensively, relative to one having no slots or fewer slots. The slots 30A are positioned substantially perpendicular to a longitudinal axis of bending C1 of the substrate. The slots 30B are positioned at an angle other than perpendicular to the axis C1. The stiffness of the substrate 14 is sufficiently low enough to allow the substrate to bend with the SMA wires 12 when the SMA wires are heated above the austenite transition temperature A1, as described below. In addition, the stiffness of the substrate 14 is sufficiently high enough to assist the SMA wires 12 to return to the at-rest position after being in the actuated configuration. While the slots 30A and 30B are described as extending through the substrate 14, the present invention is not limited in this regard as slots or grooves which extend partially into one or more surfaces of the substrate, or a substrate with no slots or grooves may also be employed without departing from the broader aspects of the present invention.

The substrate 14 is also sufficiently incompressible along the axis C1 to withstand being axially compressed in response to forces imposed on the substrate caused by axial contraction of the SMA wires 12, as explained in detail below. In addition, the slots 30A and 30B are sized and positioned in the substrate to ensure the substrate maintains the ability to withstand being axially compressed in response to the forces imposed on the substrate caused by the axial contraction of the SMA wires 12. While twelve slots 30A and 30B are shown (in FIG. 3) and described, the present invention is not limited in this regard as any number of slots can be employed depending on the stiffness and incompressibility of the substrate that is desired.

The substrate 14 is manufactured from a dialectic material and is able to withstand temperatures up to about 212 degrees F. without melting, losing stiffness or losing incompressibility. Although the substrate 14 is described as being manufactured from a dialectic material and being able to withstand temperatures up to about 212 degrees F. without melting, losing stiffness or losing incompressibility, the present invention is not limited in this regard as materials which withstand such melting, loss of stiffness or loss of incompressibility at lower temperatures may also be employed with or without additional features such as insulating pads positioned between the SMA wires 12 and the substrate and/or stiffeners positioned on or embedded in the substrate.

In addition, in the illustrative embodiment of FIG. 3 the substrate 14 is shown as being substantially rectangular. Although the substrate 14 is described and illustrated as being substantially rectangular, the present invention is not limited in this regard as the substrate can be of any shape or size.

In one embodiment, the substrate 14 is manufactured from a thin sheet of a flexible plastic, such as poly-ethylene-terephthalate (PET) having a thickness TT of about 0.007 inches, as shown in FIG. 1. Although the substrate is described as being manufactured from PET, the present invention is not limited in this regard as other resilient materials, including but not limited to polyethylene, polypropylene, vinyl and nylon can be employed without departing from the broader aspects disclosed herein. While the substrate 14 is described as being about 0.007 inches thick the present invention is not limited in this regard, as substrates of any suitable thickness can be employed depending on the stiffness and incompressibility best suited for a particular use.

Referring to FIG. 1, portions of the SMA wires 12 between the opposing ends 12A and 12B are restrained from extending beyond the surface 14S of the substrate 14 more than the distance H, by the thread 18 stitched around the SMA wire and through the substrate 14. Thus the axis C of the SMA wire 12 and the axis C1 of the substrate 14 are spaced apart by a distance H1. The distance H1 is referred to hereinafter as the moment arm, as discussed further below with reference to FIG. 6. In one embodiment the distance H1 is about 0.013 inches to about 0.024 inches. The thread 18 is stitched to the substrate in a zigzag pattern along each of the SMA wires 12. The thread is made of a material that can withstand contact with the SMA wires 12 up to temperatures of about 212 degrees F., without degrading the restraint of the SMA wires. In one embodiment the thread 18 is manufactured from a synthetic fiber such as Polyester or Nylon. In one embodiment, the thread 18 is stitched around the SMA wires 12 to the substrate with a stitching having approximately twenty five threads per inch, thereby maintaining tension in the thread high enough to prevent any slack.

Restraining the SMA wires 12 from extending beyond the surface 14S of the substrate 14 more than the distance H has utility in minimizing an amount of contraction of the SMA wires required to generate a predetermined amount of bending. For example, the amount of contraction of the SMA wires 12 required to effectuate a predetermined amount of bending decreases linearly with the distance H1. Thus by minimizing the distance H1 more bending can be achieved with less contraction of the SMA wires. In addition, the use of the thread 18 allows the SMA wires 12 to slide, relative to the thread, as the SMA wires contract, thereby reducing friction between the SMA wires and the thread 18 and decreasing the forces required to cause bending of the SMA wires and/or the substrate. Furthermore, the use of the threads 18 serve as heat transfer fins which facilitate conductive heat transfer between the thread and the SMA wires 12. In addition, spaces between adjacent stitches of the thread improves convective heat transfer between the SMA wires 12 and an ambient fluid such as air that is in contact with the wire. Such improved heat transfer increases the rate of cooling of the SMA wires 12 and results in a more rapid rate of movement of the SMA wires to the at-rest configuration, compared to other SMA wires including those disposed in tubes.

While the thread 18 is described as restraining the SMA wires 12 from extending beyond the surface 14S of the substrate 14 more than the distance H and improving heat transfer from the SMA wires, the present invention is not limited in this regard as the SMA wires can be secured to the substrate 14 by other fasteners including use of multiple pieces of thread, staples, thermal bonding, chemical bonding, tubes and wires. In addition, other methods for improving heat transfer from the SMA wires 12 can be employed including but not limited to use of heat transfer fins and SMA wires having non-circular cross sections.

As described above, the SMA wires 12 are secured on the opposing ends 12A and 12B to the substrate 14 by the connectors 16A and 16B and that the electrical conductors 22A and 22B are secured to and are in electrical communication with the connectors 16A and 16B, respectively. In one embodiment, the connectors 16A and 16B are rivets. In addition, the electrical conductors 22A and 22B are sufficiently thin and light weight so as not to interfere with bending of the SMA wires 12, the substrate 14 and the cover 20.

Figure 4:
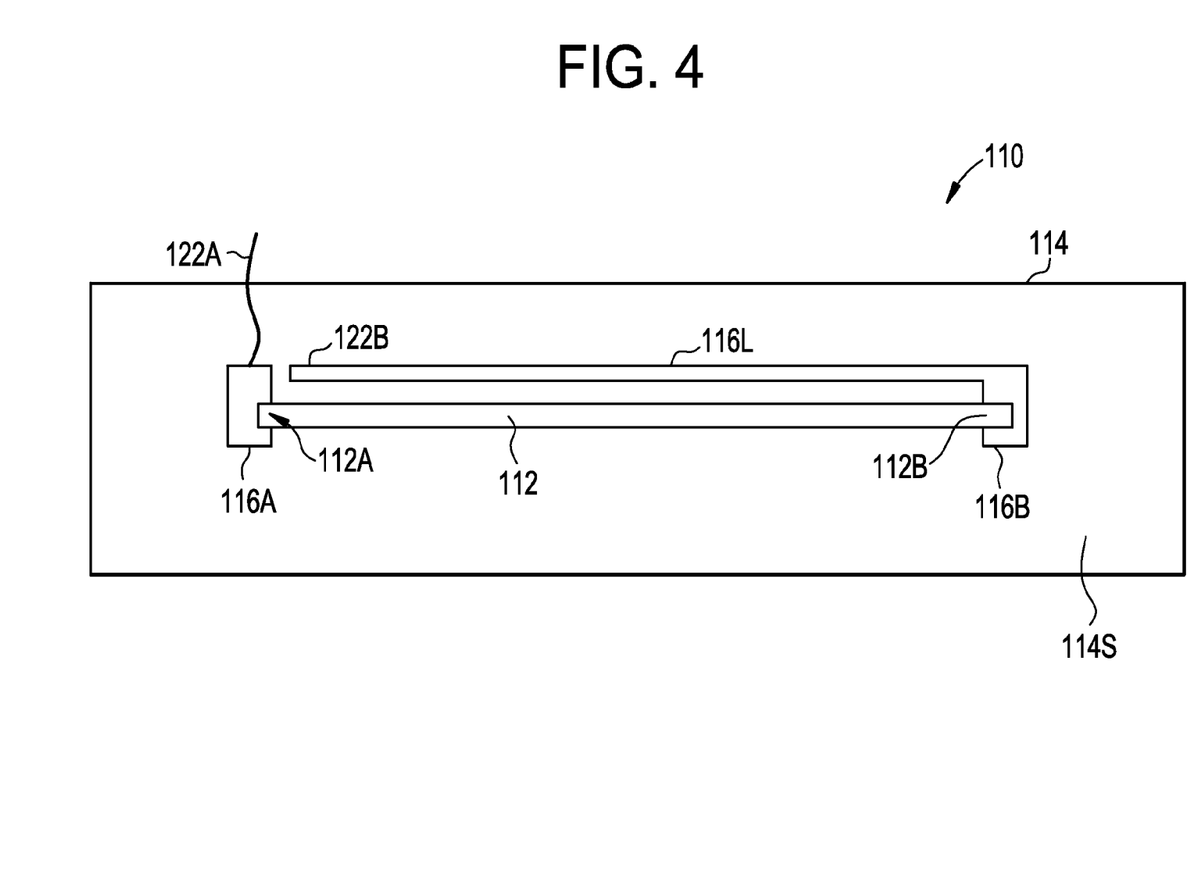
FIG. 4 is a top view of a portion of the actuator assembly of FIG. 1 having an electrical conductive track.

The actuator assembly 110 illustrated in FIG. 4 is similar to that of FIG. 1. Accordingly, like elements are assigned like reference numbers preceded by the numeral 1. As shown in FIG. 4, an SMA wire 112 is secured on opposing ends 112A and 112B to a substrate 114 by connectors 116A and 116B. In addition, the connector 116B has a thin electrically conductive track, for example an elastic strip 116L secured to the substrate 114 and is in electrical communication therewith. The electrically conductive strip 116L extends to and terminates a short distance away from the connector 116A. In addition, the electrically conductive strip 116L is secured to the substrate so that electrically conductive strip bends with the substrate 114 without creating any substantial resistance to the bending. An electrical conductor 122A is secured to and is in electrical communication with the connector 116A; and an electrical conductor 122B is in electrical communication with an end of the electrically conductive strip 116L adjacent to the connector 116A. The electrically conductive strip 116L is spaced apart from portions of the SMA wire 112 positioned between the opposing ends 112A and 112B, to prevent electrical short circuiting therewith. In one embodiment, the electrically conductive strip 116L has one face coated with an adhesive layer which is applied to the substrate 114 using pressure or a combination of pressure and heat using a hot stamping process.

Referring again to FIG. 1 and as described above, the flexible cover 20 is disposed over the SMA wires 12 and the thread 18; and the cover 20 is secured to the substrate 14. In one embodiment, the cover 20 is manufactured from a thin, flexible film of plastic such as low density polyethylene (LDPE). However, it is contemplated that other suitable materials such as, but not limited to vinyl and urethane films, stretch fabrics, such as a blend of nylon and LYCRA® fiber can be employed for construction of the cover 20, without departing from the broader aspects disclosed herein. The cover 20 is capable of resisting the high temperature from the SMA wires up to temperatures of about 212 degrees F. In one embodiment, the cover 20 is treated with a heat resistant coating. The cover 20 is approximately 0.001 inches thick. The cover 20 is attached to the substrate 14 by a suitable technique such as, but not limited to adhesive bonding, stitching, thermal bonding and ultrasonic welding.

Figure 5:
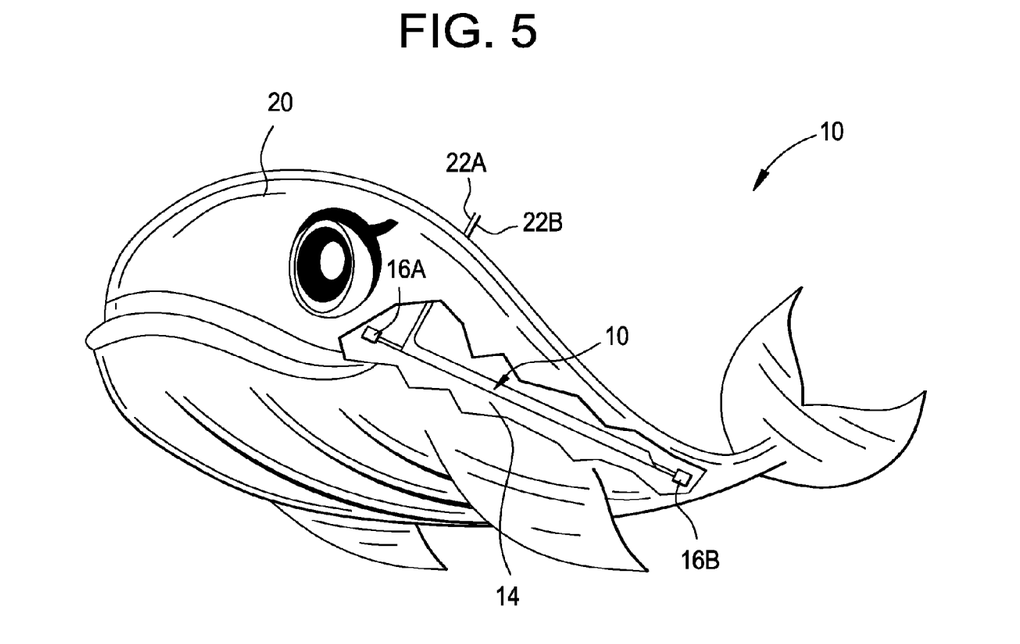
FIG. 5 is a sketch of the actuator assembly of FIG. 1 having a cover with an animated character displayed thereon and with a portion of the cover removed to show a shape memory alloy (SMA)
Figure 7:
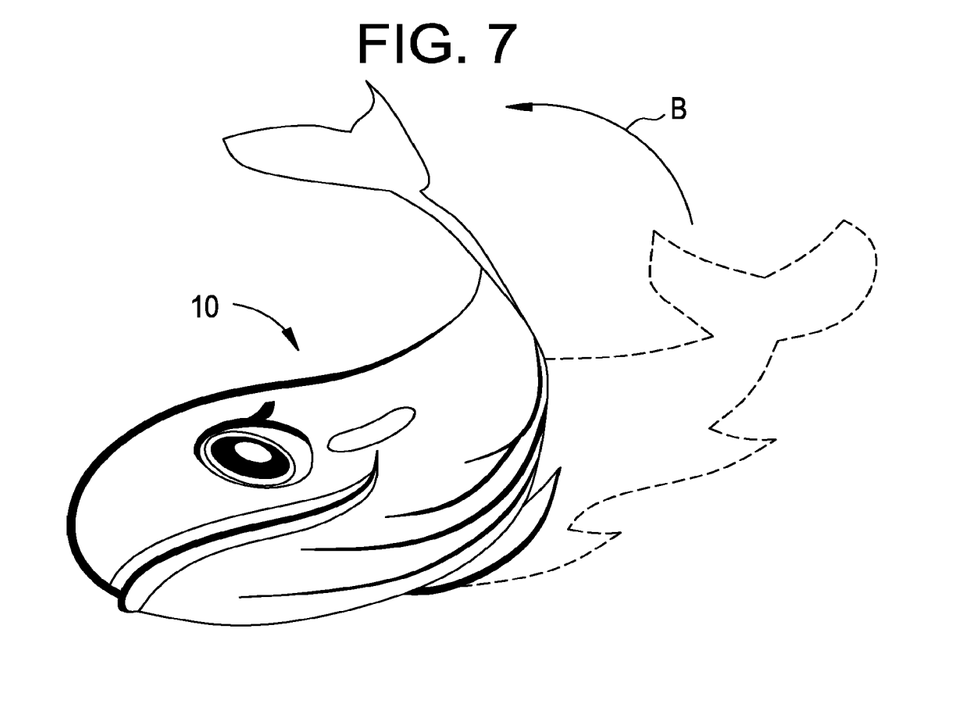
FIG. 7 is a perspective view of the actuator assembly of FIG. 1, with a cover thereon and shown in the actuated configuration.

As shown in FIGS. 5 and 7, the actuator assembly 10 is used for animating images, such as a cartoon character printed on the cover 20, for example a whale character. The cover 20 is subject to a process to enhance the printability thereon, such as a corona treatment process. The character is printed on the cover 20 using flexography, screen printing, inkjet printing or the like. While the actuator assembly 10 is described as being used for animating a cartoon character printed on the cover 20, for example a whale character, the present invention is not limited in this regard, as any object including but not limited to cartoon character with a swinging arm, an elephant with an animated trunk, a bird flapping its wings, an indicator such as an arrow, and icons depicting messages, photographs or artwork can also be printed on the cover without departing from the broader aspects disclosed herein. In addition, devices such as but not limited to hooks, plungers, linkages, Velcro® and needles, can be secured to the cover 20, the SMA wires 12 and/or the substrate 14. In one embodiment the images are disposed on the substrate.

The animation of the images includes providing an actuator assembly including a resilient substrate 14 and one or more SMA wires 12 secured to the substrate. The SMA wires 12 have an elongated length L2 and a first temperature while in an at-rest configuration; and have a contracted length L1 and a second temperature while in an actuated configuration. The first temperature is less than the second temperature and the elongated length is greater than the contracted length. In addition, the SMA wires are elastically bendable, in a temperature range encompassing the first temperature and the second temperature. A flexible cover having one or more images thereon is secured to the substrate. In one embodiment, images are disposed in the substrate. An electrical current is transmitted through the SMAs 12 thereby heating the SMA wires to the second temperature and contracting the SMA wires to the contracted length L1 and moving a portion of or the entire actuator assembly 10 from the at-rest configuration to the actuated configuration. The transmission of the electrical current is reduced and/or terminated to allow the SMA wires 12 to cool from the second temperature to the first temperature which causes a portion of or the entire actuator assembly to move from the actuated configuration to the at-rest configuration at an angular rate of greater than about 10 degrees per second. The images are animated by moving a portion of or the entire actuator assembly 10 from the at-rest configuration to the actuated configuration and/or moving a portion of or the entire actuator assembly from the actuated configuration to the at-rest configuration at the angular rate of greater than about 10 degrees per second.

Figure 6:
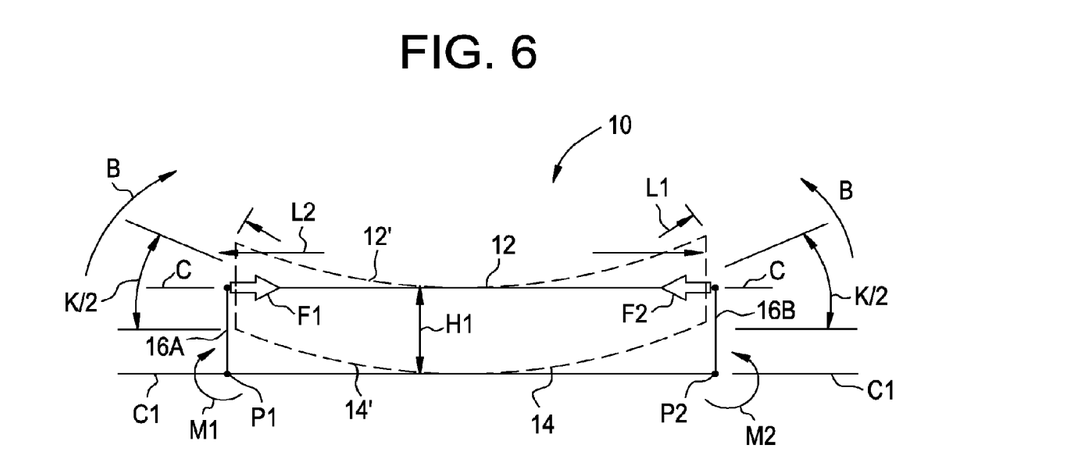
FIG. 6 is a schematic force and moment diagram of the actuator assembly of FIG. 1.
Figure 8:
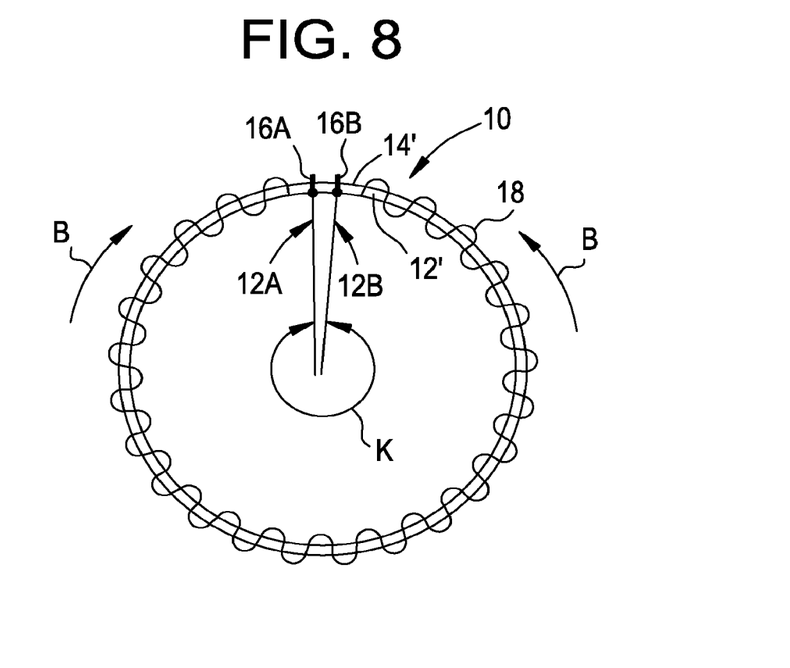
FIG. 8 is schematic side view of a portion of the actuator assembly shown in the actuated configuration with a 360 degree bend.

Referring to FIGS. 6-8, during operation, the electrical current is transmitted through the SMA wires 12 causing the SMA wires to heat up above the initial austenite transformation temperature A1. As a result of the heating, the SMA wires 12 begin to axially contract without application of any external forces, such as application of compressive forces thereto. The axial contraction of the SMA wires 12 causes forces F1 and F2 to be applied to the connectors 16A and 16B, respectively. Since the axis C of the SMA wires 12 and the axis C1 of the substrate 14 are spaced apart by a distance H1 thereby creating the moment arm, application of the forces F1 and F2 creates moments M1 (M1=F1×H1) and M2 (M2=F2×H1) about points P1 and P2 located at the juncture of the substrate and the connectors 16A and 16B, respectively.

Application of the moments M1 and M2 to the points P1 and P2 cause the substrate 14 and the SMA wires 12 to bend in the direction shown by the arrows B. For example dashed lines in FIG. 6 depict the substrate 14' and the SMA wires 12' in the actuated configuration, with each of the opposing ends of the SMA wires being bent at an angle of K/2 for a total bending angle K (i.e., K/2+K/2=K). The substrate 14' and the SMA wires 12' continue to bend until the final austenite transformation temperature A2 is reached and the SMA wires 12' contract to the length L1. In the embodiment illustrated in FIG. 8, the SMA wires 12' and substrate 14' are bent to an angle K of about 360 degrees so that the opposing ends 12A and 12B become adjacent to one another. While the actuated configuration is shown and described as having the actuator assembly 10 bent, the present invention is not limited in this regard as the actuated configuration could have the actuator assembly being substantially flat, partially bent and the at-rest configuration having the actuator assembly being bent.

When the electrical current is terminated from flowing through the SMA wires 12, the SMA wires cool to below the initial martensite transformation temperature M1 and eventually to the final martensite transition temperature M2, during which time the SMA wires 12 elongate to the elongated length L2. During the cooling and elongation of the SMA wires 12 to the at-rest configuration, the forces F1 and F2 decrease to a previous magnitude, for example approximately zero, as do the moments M1 and M2. The stiffness of the substrate 14 urges the SMA wires 12 to return to the at-rest configuration illustrated in FIG. 1.

Figure 9:
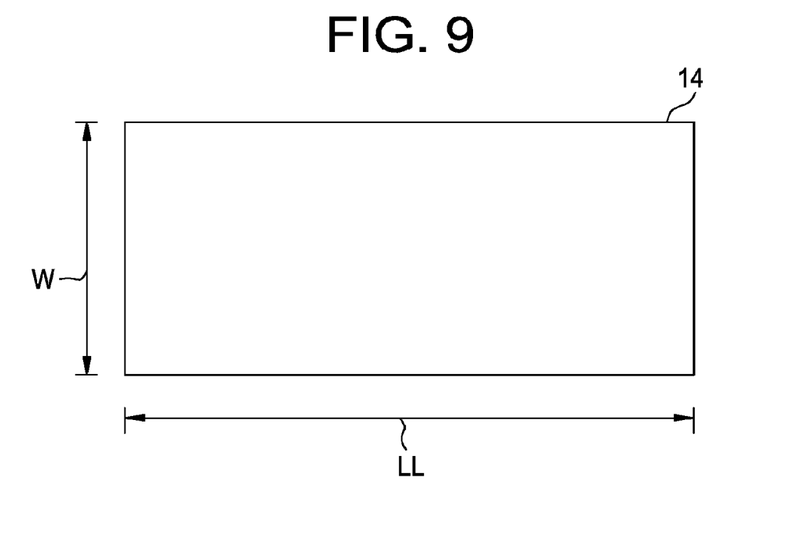
FIG. 9 is a top view of a substrate with no slots.
Figure 10:
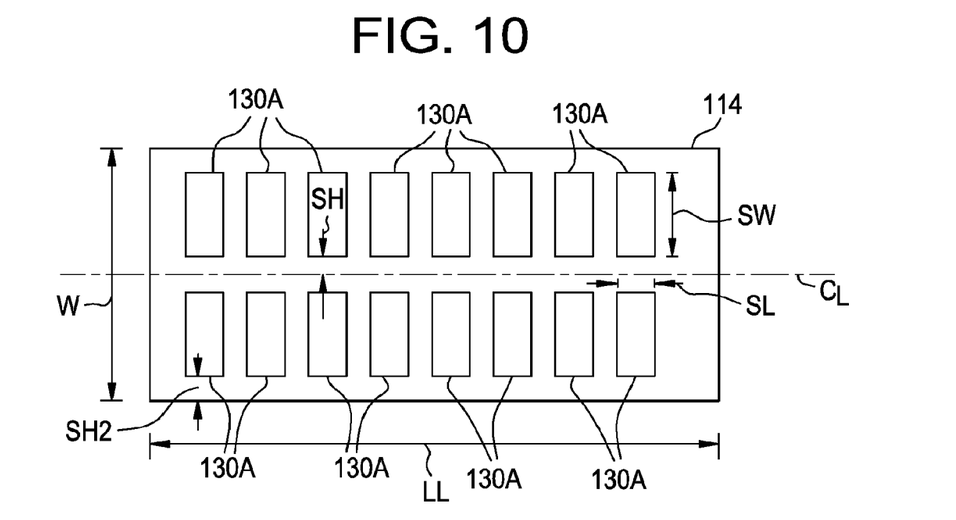
FIG. 10 is a top view of a substrate with slots.

The actuator assembly 10 can assume many different configurations and operating characteristics. Three examples, namely Examples 1-3, are described below and parameters relating to each of Examples 1-3 are summarized in Tables 2-7. The actuator assembly 10 can be of a substantially rectangular substrate 14 having a width W and a length LL, as shown in FIGS. 9 and 10. Each of the actuator assemblies 10, described in Tables 2-7 have one of the SMA wires 12. The curvature K in Table 6 refers to the magnitude of bending of the actuator assembly 10 between the at-rest configuration and the actuated configuration. The angular bending rate in Table 6 refers to the rate of movement of the actuator assembly 10 between the at-rest configuration and the actuated configuration. The reset time in Table 7 refers to the time for the actuator assembly 10 to move from the actuated configuration to the at-rest configuration, after termination of the transmission of current through the SMA wires 12. The angular movement rate in Table 7 refers to the angular movement rate of the actuator assembly 10 when moving from the actuated configuration to the at-rest configuration.

TABLE 2

| | | SMA Wire | | | | | | |
|---|---|---|---|---|---|---|---|---|
| Example | Material | Length L2 (in) | Initial Length L1 (in) | Diameter D (in) | A1 (° F.) | A2 (° F.) | M1 (° F.) | M2 (° F.) |
| 1 | Nickel-titanium alloy | 3.0625 | 2.9375 | 0.006 | 154.4 | 172.4 | 125.6 | 107.6 |
| 2 | Nickel-titanium alloy | 3.0625 | 2.9375 | 0.006 | 154.4 | 172.4 | 125.6 | 107.6 |
| 3 | Nickel-titanium alloy | 3.0625 | 2.9375 | 0.006 | 154.4 | 172.4 | 125.6 | 107.6 |

TABLE 3

| Example | Slots | Material | Thickness TT (in) | Width W (in) | Length LL (in) | Area (sq in) | Bending Stiffness lb (sq in) |
|---|---|---|---|---|---|---|---|
| | | Substrate | | | | | |
| 1 | None | Polyester film (PET) | 0.007 | 1 | 5 | 5 | 2.12E−02 |
| 2 | None | Polyester film (PET) | 0.007 | 1.5 | 5 | 7.5 | 3.17E−02 |
| 3 | 16 slots (130 A) SW = 0.25 inch SL = 0.5 inch | Polyester film (PET) | 0.007 | 1.5 | 5 | 5.5 | 1.00E−02 |

TABLE 4

| Example | Diameter (Inches) | Stitch per Inch | Moment Arm H1 (in) |
|---|---|---|---|
| | Thread | | |
| 1 | 0.005 | 27 | 0.013 |
| 2 | 0.005 | 27 | 0.013 |
| 3 | 0.005 | 27 | 0.013 |

TABLE 5

| Example | Material | Length (in) | Thickness (in) |
|---|---|---|---|
| | Cover | | |
| 1 | Low Density Polyethylene (LDPE) | 5 | 0.001 |
| 2 | Low Density Polyethylene (LDPE) | 5 | 0.001 |
| 3 | Low Density Polyethylene (LDPE) | 5 | 0.001 |

TABLE 6

Movement from the at-rest configuration to the actuated configuration.

| Example | Current (mA) | Current Application Time (s) | SMA Length for Given Substrate Curvature | Curvature K (deg) | Activation Time (sec) | Angular Bending Rate (deg/s) | Stress (ksi) | Force (lb) | Tip Moment (lb in) |
|---|---|---|---|---|---|---|---|---|---|
| 1 | 600 | 1.4 | 3.017 | 200 | 1.4 | 143 | 66 | 1.86 | 0.024 |
| 2 | 600 | 4.6 | 3.044 | 83 | 4.6 | 18 | 50 | 1.4 | 0.018 |
| 3 | 600 | 2 | 3.008 | 239 | 2 | 120 | 35 | 1 | 0.013 |

TABLE 7

Movement from the actuated configuration to the at-rest configuration.

| Example | Reset Time (seconds) | Angular Movement Rate (deg/s) |
|---|---|---|
| 1 | 2.8 | 71 |
| 2 | 3.6 | 23 |
| 3 | 3.8 | 63 |

TABLE 8

| Example | Total Cycle Bending Rate to Current Ratio (deg/(s · Amps)) |
|---|---|
| 1 | 179 |
| 2 | 34 |
| 3 | 153 |

Example 1

Referring to Tables 2-7 and FIGS. 1-9, in one embodiment, referred to here as Example 1, the actuator assembly 10 includes a substrate 14 defined by the width W about 1.0 inches and the length LL is about 5.0 inches. The SMA wire 12 has an initial length L1 of about 2.9375 inches, an elongated length L2 of about 3.0625 inches and an outside diameter of about 0.006 inches.

As stated in Table 2, the SMA wire 12 is manufactured from a nickel titanium alloy and has an initial austenite transformation temperature A1 of about 154.4 degrees Fahrenheit; a final austenite transition temperature A2 of about 172.4 degrees Fahrenheit; an initial martensite transition temperature M1 of about 125.6 degrees Fahrenheit; and a final martensite transition temperature M2 of about 107.6 degrees Fahrenheit.

As stated in Table 3, the substrate 14 is manufactured from PET and is about 0.007 inches thick. The substrate 14 has a length LL of about 5.0 inches; a width W of about 1.0 inch; an overall surface area of about 5.0 square inches and a bending stiffness of about $2.12 \times 10^{-2}$ lb-in$^2$. There are no slots 30A or 30B formed in the substrate. The SMA wire 12 is secured to the substrate 14 with a 0.005 inch diameter thread 18 in a 27 stitch per inch configuration, as stated in Table 4. The moment arm H1 is about 0.013 inches.

As stated in Table 5, the cover 20 is manufactured from LDPE, is about the same length and width as the substrate 14 and is about 0.001 inches thick.

As stated in Tables 6 and 7, application of an electrical current of 600 milliamps for 1.4 seconds causes the SMA wire to contract to a length of 3.017 inches and a curvature K of about 200 degrees, in about 1.4 seconds, resulting in an angular bending rate of about 143 degrees per second, when moving from the at-rest configuration to the actuated configuration. The contraction results in a stress of about 66 ksi in the SMA wire and an application of a force of about 1.86 pounds to the connectors 16A and 16B. Thus the contraction creates a moment of about 0.024 in-lb about the juncture of the connectors and the substrate. Upon termination of the electrical current flow through the SMA wire 12, the SMA wire expands to a length of 3.0625 inches and an angle of about zero degrees in about 2.8 seconds, thereby causing an angular rate of movement of about 71 degrees per second, when moving from the actuated configuration to the at-rest configuration. From Tables 6 and 7 a ratio of total cycle bending rate to current is calculated in units of degree/(second*amperes). Average bending rate=(angular bending rate from the at-rest configuration to the actuated configuration from Table 6+angular movement rate from the actuated configuration to the at-rest configuration from Table 7)/2). As shown in Table 8, for Example 1, the total cycle bending rate is about 179 degree/(second*amperes).

Example 2

Referring to Tables 2-7 and FIGS. 1-9, in one embodiment, referred to here as Example 2, the actuator assembly 10 includes a substrate 14 defined by the width W about 1.5 inches and the length LL is about 5.0 inches. The SMA wire 12 has an initial length L1 of about 2.9375 inches, an elongated length L2 of about 3.0625 inches and an outside diameter of about 0.006 inches.

As stated in Table 2, the SMA wire 12 is manufactured from a nickel titanium alloy and has an initial austenite transformation temperature A1 of about 154.4 degrees Fahrenheit; a final austenite transition temperature A2 of about 172.4 degrees Fahrenheit; an initial martensite transition temperature M1 of about 125.6 degrees Fahrenheit; and a final martensite transition temperature M2 of about 107.6 degrees Fahrenheit.

As stated in Table 3, the substrate 14 is manufactured from PET and is about 0.007 inches thick. The substrate 14 has a length LL of about 5.0 inches; a width W of about 1.5 inch; an overall surface area of about 7.5 square inches and a bending stiffness of about $3.17 \times 10^{-2}$ lb-in$^2$. There are no slots 30A or 30B formed in the substrate. The SMA wire 12 is secured to the substrate 14 with a 0.005 inch diameter thread 18 in a 27 stitch per inch configuration, as stated in Table 4. The moment arm H1 is about 0.013 inches.

As stated in Table 5, the cover 20 is manufactured from LDPE, is about the same length and width as the substrate 14 and is about 0.001 inches thick.

As stated in Tables 6 and 7, application of an electrical current of 600 milliamps for 4.6 seconds causes the SMA to contract to a length of 3.044 inches and a curvature K of about 83 degrees, in about 4.6 seconds, resulting in an angular bending rate of about 18 degrees per second, when moving from the at-rest configuration to the actuated configuration. The contraction results in a stress of about 50 ksi in the SMA wire and an application of a force of about 1.4 pounds to the connectors 16A and 16B. Thus the contraction creates a moment of about 0.018 in-lb about the juncture of the connectors and the substrate. Upon termination of the electrical current flow through the SMA wire 12, the SMA wire expands to a length of 3.0625 inches and an angle of about zero degrees in about 3.6 seconds, thereby causing an angular rate of movement of about 23 degrees per second, when moving from the actuated configuration to the at-rest configuration. From Tables 6 and 7 a ratio of total cycle bending rate to current is calculated in units of degree/(second*amperes). Average bending rate=(angular bending rate from the at-rest configuration to the actuated configuration from Table 6+angular movement rate from the actuated configuration to the at-rest configuration from Table 7)/2). As shown in Table 8, for Example 2, the total cycle bending rate is about 34 degree/(second*amperes).

Example 3

Referring to Tables 2-7 and FIGS. 1-8 and 10, in one embodiment, referred to here as Example 3, the actuator assembly 10 includes a substrate 14 defined by the width W about 1.5 inches and the length LL is about 5.0 inches. The SMA wire 12 has an initial length L1 of about 2.9375 inches, an elongated length L2 of about 3.0625 inches and an outside diameter of about 0.006 inches.

As stated in Table 2, the SMA wire 12 is manufactured from a nickel titanium alloy and has an initial austenite transformation temperature A1 of about 154.4 degrees Fahrenheit; a final austenite transition temperature A2 of about 172.4 degrees Fahrenheit; an initial martensite transition temperature M1 of about 125.6 degrees Fahrenheit; and a final martensite transition temperature M2 of about 107.6 degrees Fahrenheit.

As stated in Table 3, the substrate 14 is manufactured from PET and is about 0.007 inches thick. The substrate 14 has a length LL of about 5.0 inches; a width W of about 1.5 inch; an overall surface area of about 5.5 square inches and a bending stiffness of about $1 \times 10^{-2}$ lbin$^2$.

Referring to FIG. 10 and Table 3, the substrate 114 includes 16 slots 130A formed in the substrate in two rows substantially parallel to the axis C1. Each of the rows has eight slots, each having a width SW of about 0.25 inches and a length SL of about 0.5 inches, approximately positioned therein. Each of the slots 130A is positioned a distance SH from the axis S and a distance SH2 from opposing longitudinal edges of the substrate. The slots are spaced generally equidistant from one another with the length SL being generally perpendicular to the axis C1. The SMA wire 12 is secured to the substrate 14 with a 0.005 inch diameter thread 18 in a 27 stitch per inch configuration, as stated in Table 4. The moment arm H1 is about 0.013 inches.

As stated in Table 5, the cover 20 is manufactured from LDPE, is about the same length and width as the substrate 14 and is about 0.001 inches thick.

As shown in Tables 6 and 7, application of an electrical current of 600 milliamps for 2 seconds causes the SMA to contract to a length of 3.008 inches and a curvature K of about 239 degrees, in about 2 seconds, resulting in an angular bending rate of about 120 degrees per second, when moving from the at-rest configuration to the actuated configuration. The contraction results in a stress of about 35 ksi in the SMA wire and an application of a force of about 1 pound to the connectors 16A and 16B. Thus the contraction creates a moment of about 0.013 in-lb about the juncture of the connectors and the substrate. Upon termination of the electrical current flow through the SMA wire 12, the SMA wire expands to a length of 3.0625 inches and an angle of about zero degrees in about 3.8 seconds, thereby causing an angular rate of movement of about 63 degrees per second, when moving from the actuated configuration to the at-rest configuration. From Tables 6 and 7 a ratio of total cycle bending rate to current is calculated in units of degree/(second*amperes). Average bending rate= (angular bending rate from the at-rest configuration to the actuated configuration from Table 6+angular movement rate from the actuated configuration to the at-rest configuration from Table 7)/2). As shown in Table 8, for Example 2, the total cycle bending rate is about 153 degree/(second*amperes).

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actuator assembly comprising:
   a resilient substrate;
   at least one shape memory alloy secured to said substrate and configured to bend said resilient substrate and said at least one shape memory alloy in a common direction between an at-rest configuration and an actuated configuration;
   said at least one shape memory alloy having an elongated length and a first temperature while in said at-rest configuration and having a contracted length and a second temperature while in said actuated configuration, wherein said first temperature is less than said second temperature and said elongated length is greater than said contracted length;
   said at least one shape memory alloy being elastically bendable, in a temperature range encompassing said first temperature and said second temperature;
   said at least one shape memory alloy being contractable from said elongated length to said contracted length in response to transmission of an electrical current through said at least one shape memory alloy, said electrical current being sufficient to heat said at least one shape memory alloy from said first temperature to said second temperature and bending said resilient substrate and said at least one shape memory alloy from said at-rest configuration to said actuated configuration; and
   said at least one shape memory alloy being elongatable from said contracted length to said elongated length in response to reduction or termination of said electrical current, said shape memory alloy having sufficient heat dissipation means to enable cooling of said at least one shape memory alloy from said second temperature to said first temperature and to thereby bend said resilient substrate and said at least one shape memory alloy from said actuated configuration to said at-rest configuration.

2. The actuator assembly of claim 1, wherein said at least one shape memory alloy comprises a wire.

3. The actuator assembly of claim 1, wherein said at least one shape memory alloy is restrained from extending beyond a predetermined distance from a surface of said substrate by at least one fastener.

4. The actuator assembly of claim 3, wherein said at least one fastener comprises a thread stitched around said at least one shape memory alloy and through said substrate.

5. The actuator assembly of claim 1, comprising a flexible electrically conductive strip disposed on said substrate and being elastically bendable in the common direction, with said substrate said electrical current being transmitted to said shape memory alloy by said flexible electrically conductive strip.

6. The actuator assembly of claim 1, wherein said substrate defines at least one slot extending at least partially through said substrate, said at least one slot being configured to decrease stiffness of said substrate.

7. The actuator assembly of claim 1, wherein a flexible cover is disposed over said shape memory alloy and secured to said substrate, said cover being bendable in said common direction, coincident with said resilient substrate and said at least one shape memory alloy.

8. The actuator assembly of claim 7, wherein said cover includes at least one image disposed thereon.

9. The actuator assembly of claim 1, wherein:
   said at least one shape memory alloy has a first end and a second end, the first end being secured to and spaced apart a first distance from said substrate by a first connector and said second end being secured to and spaced apart a second distance from said substrate by a second connector; and
   said at least one shape memory alloy and said substrate being bendable between said first connector and said second connector.

10. The actuator assembly of claim 9, wherein contraction of said at least one shape memory alloy between said first connector and said second connector causes equal and oppositely directed forces to be applied to said first connector and said second connector, said forces acting through respective moment arms at a juncture of the respective one of said first connector and said second connector with the substrate and causing the at least one shape memory alloy and said substrate to bend.

11. The actuator assembly of claim 1, wherein said at least one shape memory alloy is configured to bend all of said actuator assembly.

12. The actuator assembly of claim 1, wherein in said at-rest configuration said at least one shape memory alloy has an axially oriented plastic strain of 5 percent.

13. An actuator assembly comprising:
   a resilient substrate;
   at least one shape memory alloy secured to said substrate and configured to bend said resilient substrate and said at least one shape memory alloy in a common direction between an at-rest configuration and an actuated configuration;
   said at least one shape memory alloy having an elongated length and a first temperature while in said at-rest configuration and having a contracted length and a second temperature while in said actuated configuration, wherein said first temperature is less than said second temperature and said elongated length is greater than said contracted length;
   said at least one shape memory alloy being elastically bendable, in a temperature range encompassing said first temperature and said second temperature;
   said at least one shape memory alloy being contractable from said elongated length to said contracted length in response to transmission of an electrical current through said at least one shape memory alloy, said electrical current being sufficient to heat said at least one shape memory alloy from said first temperature to said second temperature and bending said resilient substrate and said at least one shape memory alloy from said at-rest configuration to said actuated configuration;
   said at least one shape memory alloy being elongatable from said contracted length to said elongated length in response to reduction or termination of said electrical current, said shape memory alloy having sufficient heat dissipation means to enable cooling of said at least one shape memory alloy from said second temperature to said first temperature and to thereby bend said resilient substrate and said at least one shape memory alloy from said actuated configuration to said at-rest configuration;
   said shape memory alloy is configured to have a ratio of total cycle bending rate to a magnitude of said electrical current, said total cycle bending rate being an average of a bending rate during contraction from said elongated length to said contracted length and said elongation from said contracted length to said elongated length; and
   said ratio of total cycle bending rate to said magnitude of said electrical current is greater than 34 degree/(second·ampere).

14. The actuator assembly of claim 13, wherein said ratio of total cycle bending rate to said magnitude of said electrical current is greater than 153 degree/(second·ampere).

* * * * *